Patented Dec. 25, 1923.

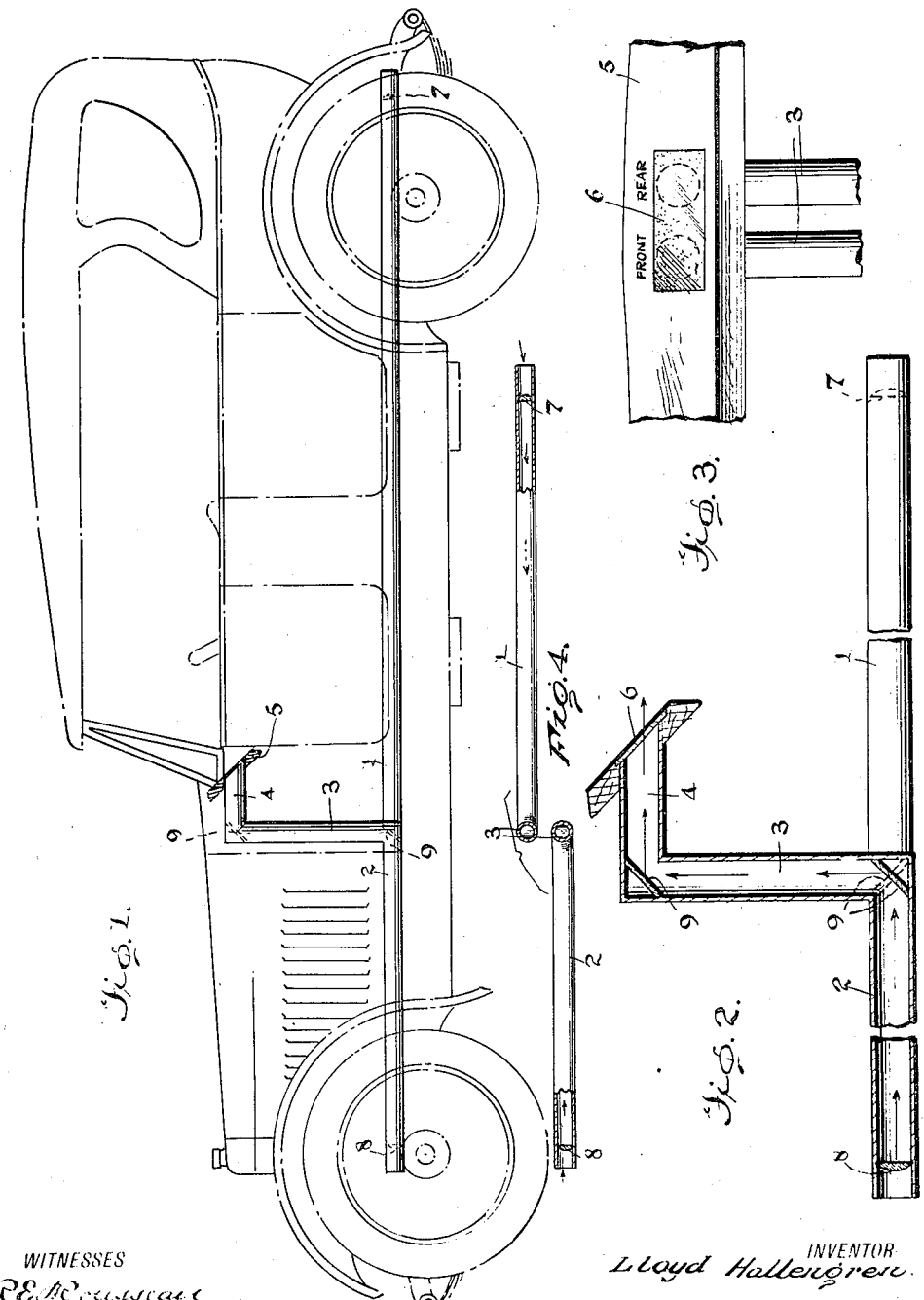

1,478,650

UNITED STATES PATENT OFFICE.

LLOYD HALLENGREN, OF SANTA ROSA, CALIFORNIA.

AUTOMOBILE PERISCOPE.

Application filed August 27, 1921. Serial No. 496,110.

*To all whom it may concern:*

Be it known that I, LLOYD HALLENGREN, a citizen of the United States, and a resident of Santa Rosa, in the county of Sonoma and State of California, have invented certain new and useful Improvements in Automobile Periscopes, of which the following is a specification.

My invention relates to improvements in periscopes, and it consists of the construction, arrangement and mode of employment substantially as herein described and claimed.

The foremost object of the invention is to provide one or more periscopes for an automobile or other vehicle, to be disposed in any desired or convenient manner so as to readily enable the operator to obtain a vision of the objects in front and behind, or perhaps of objects in other relations to the vehicle.

Other objects and advantages will appear in the following specification, reference being had to the accompanying drawing, in which:

Figure 1 is a side elevation, illustrating the application of the improved periscope to an automobile, Figure 2 is a detail sectional view illustrating the arrangement of mirrors and ground view glass, Figure 3 is a detail elevation of the instrument board, and Figure 4 is a detail horizontal section showing how the two branches of the periscope meet substantially in the center and from there continue up to the instrument board.

Signal devices have been devised from time to time for use particularly on automobiles, for apprising the drivers of vehicles on the street of the intentions of a particular driver to either stop or turn to the right or left. Mirrors of various descriptions have also been devised to enable the driver of an automobile to see objects in back of him, so that he may be properly governed in manipulating his vehicle.

It is to the latter class of inventions to which the improved periscope belongs, in view of the fact that the automobile periscope herein disclosed is for the purpose of picturing before the eyes of the driver of an automobile, the object in the rear particularly. The improved periscope consists of two main horizontal tubes 1 and 2, the former extending to the rear, the latter to the front. The latter is intended to show or receive objects which may be relatively low in respect to the automobile, and therefore not so easily seen by the driver.

Each tube includes a vertical branch 3, they in turn having short horizontal branches 4 which end at the instrument board 5 of the automobile. The openings of these short branches are covered with a pane of ground glass 6 on which the images of the objects focused by the object lenses 7 and 8 are displayed very much on the order of a finder in a hand camera.

Mirrors 9 at the corners of the various tubes 1, 2, 3 and 4 reflect the image until it is finally intercepted by the ground glass 6. The mirrors 9 may be replaced by glass prisms, if desired, on the order of the optical system of a well known optical instrument. Any object within the range of the lenses 7 and 8 will be focused on the ground glass screen 6, accurately picturing to the driver the exact view within the range of either lens. The outlets on the rear and front tubes 1 and 2 may be designated by the legends "Rear" and "Front."

While the construction and arrangement of the improved automobile periscope as herein described and claimed, is that of a generally preferred form, obviously modifications and changes may be made without departing from the spirit of the invention or the scope of the claims.

I claim:—

1. The combination, of a vehicle, a main tube extending along the vehicle, a lens in the tube for producing an image of objects within the scope of said tube, a branch of said tube extending at an angle thereto, said branch in turn having a tube portion at an angle thereto, mirrors at the angles for reflecting the image produced by the lens; and a ground glass screen on the instrument board of the vehicle, covering the outlet of the tube portion to intercept the reflected image.

2. A vehicle periscope comprising a tube having a plurality of sections extending at angles to each other to reach from the instrument board of a vehicle to a point looking rearwardly, an object lens at said rearward end of the tube, means at the meeting places of the aforesaid sections situated at such angles as to reflect an image formed by said lens along the tube, and a screen, including a ground glass, situated on the instrument board at the other end of the tube and at angles both to the tube and the last reflecting means to intercept the image.

LLOYD HALLENGREN.